United States Patent
Katagiri

(10) Patent No.: US 9,066,163 B2
(45) Date of Patent: Jun. 23, 2015

(54) OPTICAL TRANSMISSION DEVICE INCLUDING A BIT RATE ADJUSTMENT FUNCTION

(71) Applicant: FUJITSU LIMITED, Kawasaki-shi, Kanagawa (JP)

(72) Inventor: Toru Katagiri, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 14/092,089

(22) Filed: Nov. 27, 2013

(65) Prior Publication Data

US 2014/0178073 A1 Jun. 26, 2014

(30) Foreign Application Priority Data

Dec. 21, 2012 (JP) ................ 2012-279652

(51) Int. Cl.
*H04J 14/00* (2006.01)
*H04Q 11/00* (2006.01)
*H04L 12/825* (2013.01)

(52) U.S. Cl.
CPC ............ *H04Q 11/0066* (2013.01); *H04L 47/25* (2013.01); *H04Q 2011/0086* (2013.01); *H04J 2203/0003* (2013.01); *H04J 2203/0091* (2013.01)

(58) Field of Classification Search
CPC .............. H04Q 11/04; H04Q 11/0428; H04Q 11/0464; H04Q 2011/0086; H04Q 2011/0088; H04J 14/08; H04J 14/0226; H04J 14/0228; H04J 14/0238; H04J 2014/0253; H04J 2203/0001; H04J 2203/0003; H04J 2203/0005; H04J 2203/0007; H04J 2203/0091

USPC .......... 398/45–47, 51–54, 58, 66, 74, 75, 98, 398/102

See application file for complete search history.

(56) References Cited

U.S. PATENT DOCUMENTS 8,854,963 B1 * 10/2014 Muma et al. ................. 370/231
2011/0286744 A1 * 11/2011 Shin et al. ..................... 398/45
(Continued)

FOREIGN PATENT DOCUMENTS

JP 2012-004839 1/2012
JP 2012-44839 1/2012

OTHER PUBLICATIONS

International Telecommunication Union—Telecommunication Standardization Sector, G. 709/Y.1331: Interfaces for the Optical Transport Network (OTN), Feb. 2012.
(Continued)

*Primary Examiner* — Dalzid Singh
(74) *Attorney, Agent, or Firm* — Staas & Halsey LLP

(57) ABSTRACT

An optical transmission device, which transmits a first frame containing second frames, includes newly adding and allocating, when a bit rate of a specific second frame among the second frames is to be changed, a time slot corresponding to an increase in the bit rate of the specific second frame to time slots previously set for the second frames in time slots of the first frame; and inputting a dummy signal as data to the newly-added time slot while performing such a setting that both of: a data writing speed and a data reading speed; and a delay time between writing and reading of the data for the newly-added time slot are in agreement with both of: a data writing speed and a data reading speed; and a delay time between writing and reading of the data for each time slot of the previously-set time slots.

8 Claims, 16 Drawing Sheets

(56) References Cited

U.S. PATENT DOCUMENTS

2012/0082456 A1* 4/2012 Su et al. .......................... 398/58
2013/0136008 A1* 5/2013 Tochio et al. ................. 370/242

OTHER PUBLICATIONS

International Telecommunication Union—Telecommunication Standardization Sector, G.7041/Y.1303: Generic Framing Procedure (GFP), Apr. 2011.

International Telecommunication Union—Telecommunication Standardization Sector, G.7044/Y.1347: Hitless Adjustment of ODUflex (GFP) (HAO), Oct. 2011.

International Telecommunication Union—Telecommunication Standardization Sector, G.872: Architecture of Optical Transport Networks, Nov. 2001.

International Telecommunication Union—elecommunication Standardization Sector, G. 709/Y.1331: Interfaces for the Optical Transport Network (OTN), Feb. 2012.

* cited by examiner

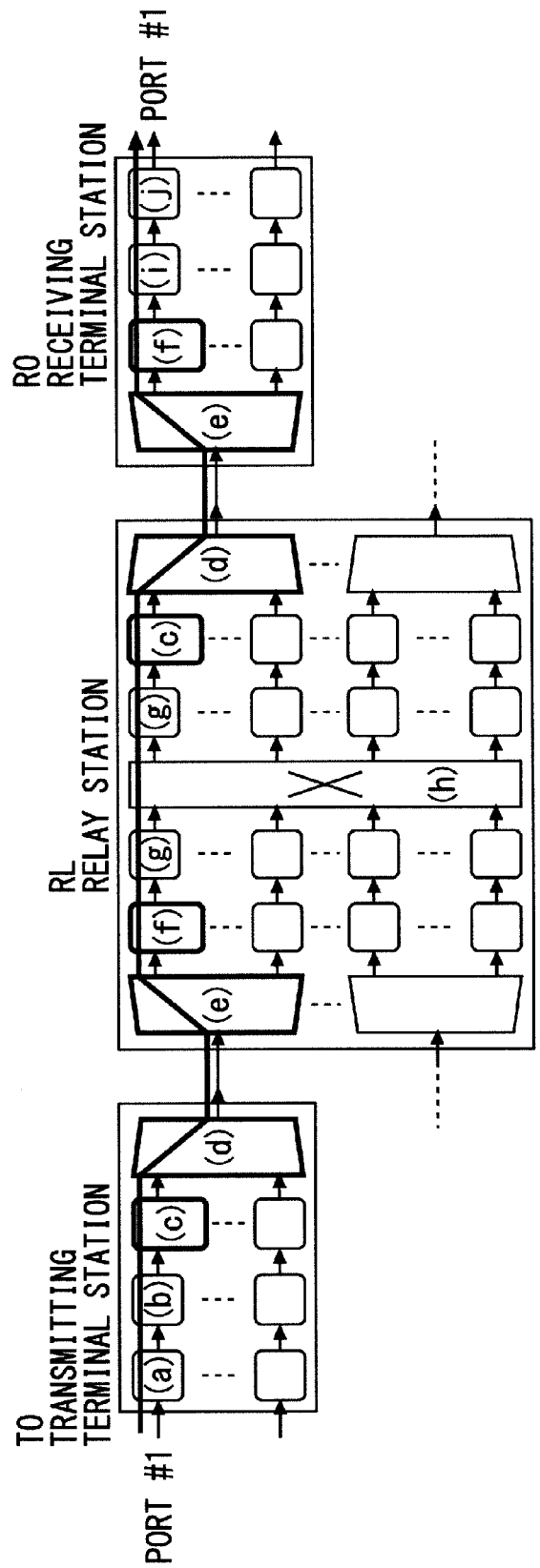

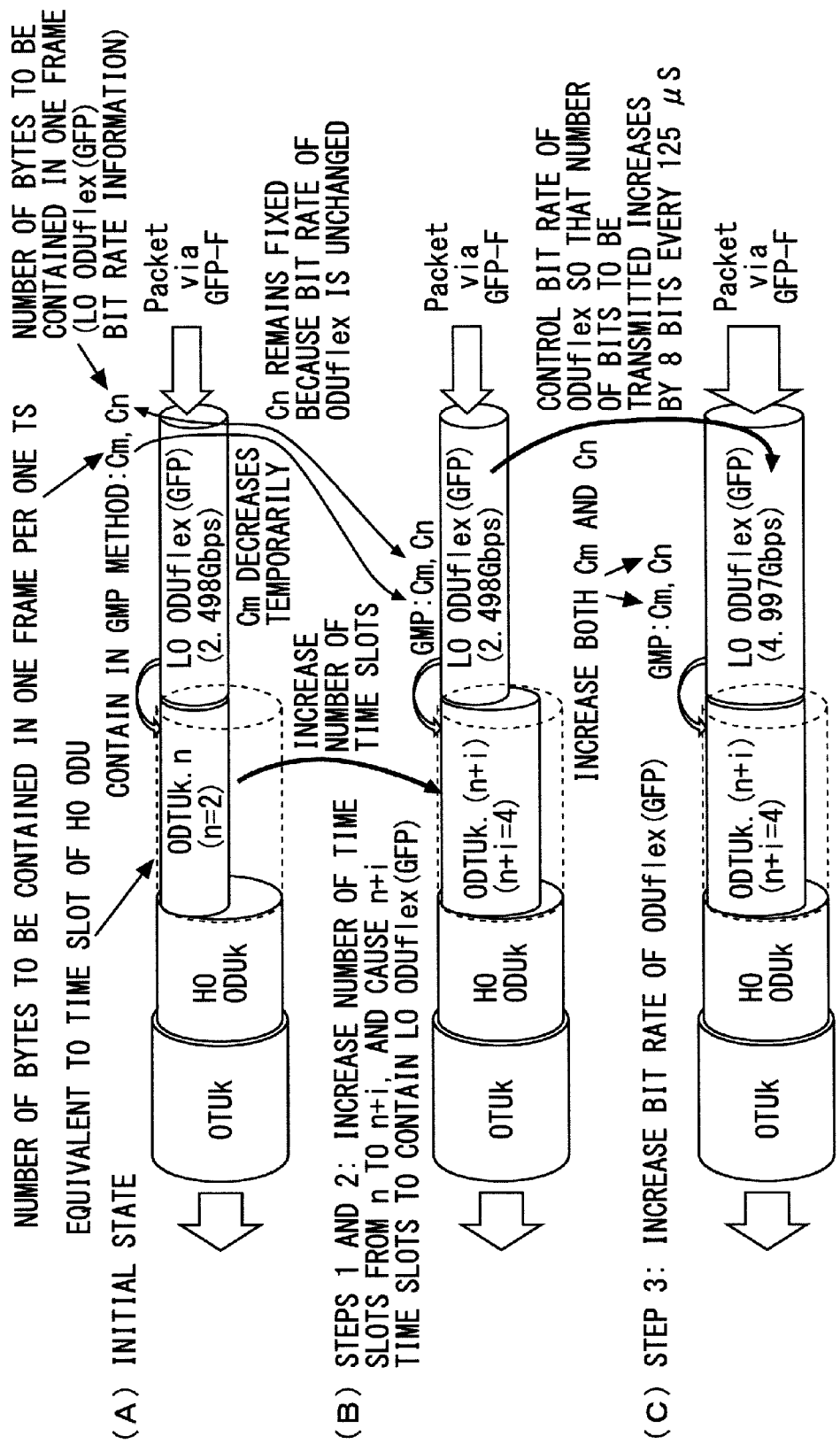

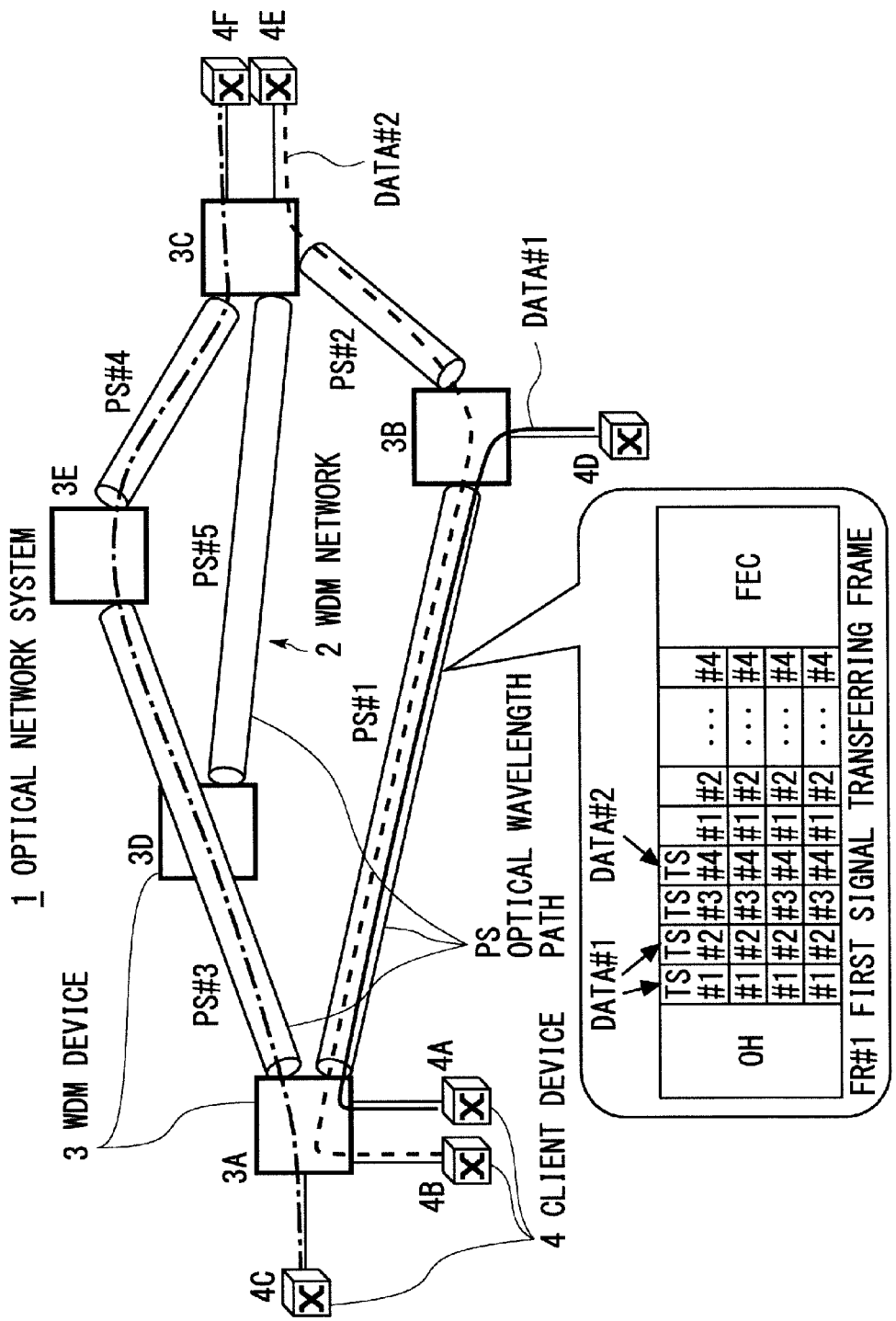

FIG. 9

|  | FIFTEENTH COLUMN | | | | | | | |
|---|---|---|---|---|---|---|---|---|
|  | BIT1 | BIT2 | BIT3 | BIT4 | BIT5 | BIT6 | BIT7 | BIT8 |
| FIRST ROW | RP | RES | RES | TPID | | | | |
| SECOND ROW | TSCC | RES | TSBS | TSGS | CTRL | | TPID | |
| THIRD ROW | CRC-3 | | | CRC-5 | | | | |

FIG. 10

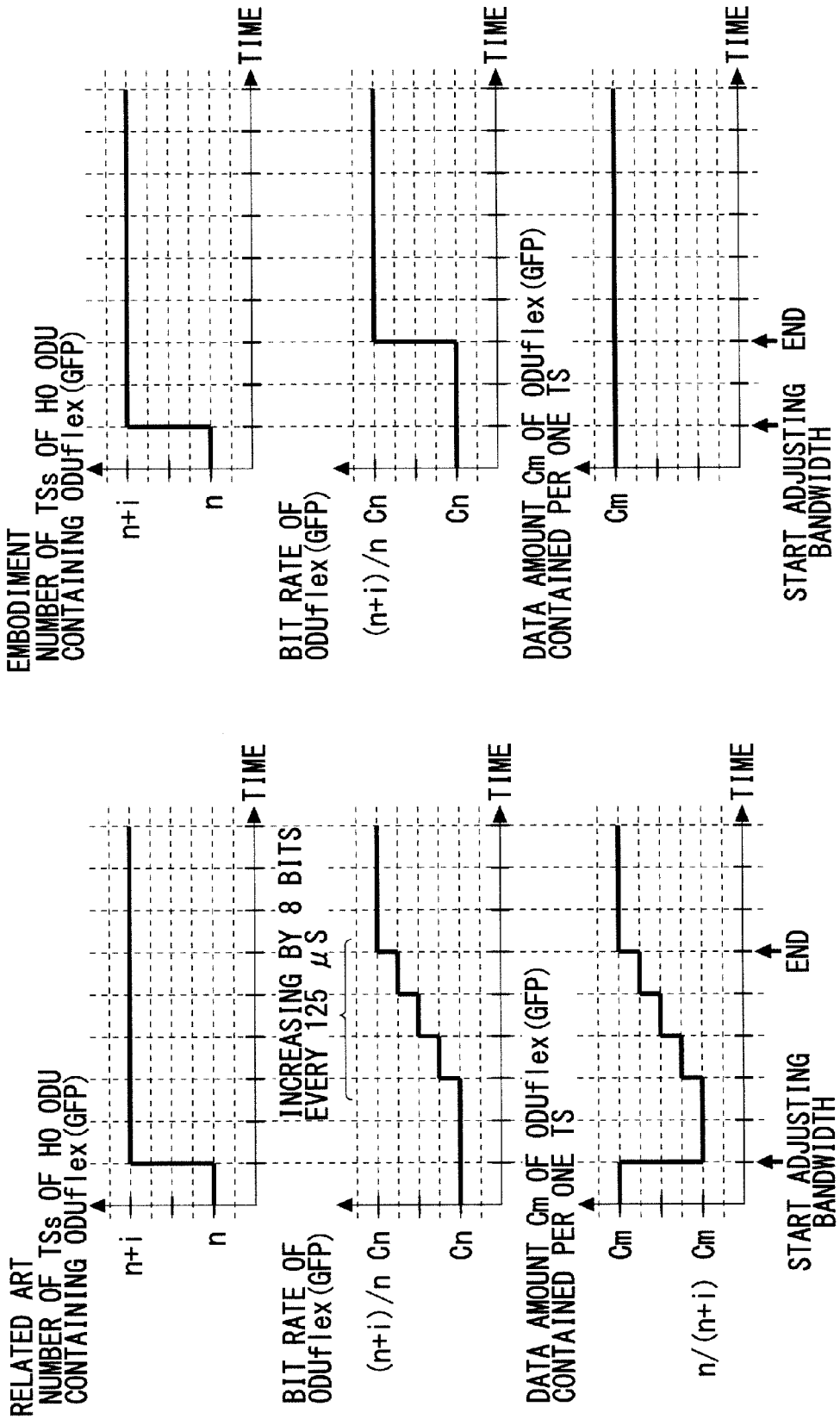

OPTICAL TRANSMISSION DEVICE INCLUDING A BIT RATE ADJUSTMENT FUNCTION

CROSS-REFERENCE TO RELATED APPLICATION

This application is based upon and claims the benefit of priority of the prior Japanese Patent Application No. JP2012-279652, filed on Dec. 21, 2012, the entire contents of which are incorporated herein by reference.

FIELD

The disclosures made herein relate to an optical transmission device including a bit rate adjustment function.

BACKGROUND

A study of an optical signal transmission technology for increasing a bandwidth is being pushed ahead as a method for realizing a high capacity for an optical network system that enables high-capacity data communications. For example, an increase in the bandwidth can be achieved by transmitting (unless otherwise limited, including exchanging and transferring) a signal after a signal having a low bit rate is contained into a frame of a high speed signal having a higher bit rate than that or by increasing a bit rate of a signal having a given bit rate to a higher speed.

The conventional optical network system forms a wavelength division multiplexing (WDM) network, and includes a plurality of WDM devices as optical transmission devices including a bit rate adjustment function.

Those WDM devices employ a WDM transmission technology conforming to ITU-T G.709/Y.1331: Interfaces for the Optical Transport Network (OTN) and ITU-T G.7044/Y.1347: Hitless Adjustment of ODUflex (GFP)(HAO) recommended by International Telecommunications Union-Telecommunication Standardization Sector (ITU-T).

A plurality of optical wavelength paths are set among those WDM devices, and a first signal transferring frame is transmitted through those optical wavelength paths. Data (client signal) output from a client device is input to the WDM device, and is contained into a second signal transferring frame having a lower bit rate than the first signal transferring frame. Further, this data is transmitted to the client device corresponding to a desired destination after being contained into a time slot (TS) allocated thereto within the first signal transferring frame.

In this optical network system, the bit rate of the second signal transferring frame is determined based on the bit rate of the data, and when the data is contained into the first signal transferring frame, a number of time slots allocated thereto is determined.

There already exists a technology for changing the bit rate of the second signal transferring frame containing the data and the number of time slots of the first signal transferring frame depending on a change of the bit rate of the data changes without giving an error to the data.

Examples of the signal transferring frame include an optical channel transport unit (OTU) frame and an optical channel data unit (ODU) frame that are recommended by ITU-T G.709/Y.1331. Further, an example of the technology for changing the bandwidth (bit rate) of the signal transferring frame containing the data and the number of time slots thereof without giving an error to the data is recommended by ITU-T G.7044/Y.1347.

The following are related arts to the invention.

[Non-patent document 1] ITU-T G.709/Y.1331: Interfaces for the Optical Transport Network (OTN)

[Non-patent document 2] ITU-T G.7041/Y.1303: Generic framing procedure (GFP)

[Non-patent document 3] ITU-T G.7044/Y.1347: Hitless Adjustment of ODUflex (GFP)(HAO)

[Non-patent document 4] ITU-T G.872: Architecture of optical transport networks

SUMMARY

A consideration is given to an example of a related art in which the recommendation of ITU-T G.709/Y.1331 is applied as the signal transferring frame as described above and in which the recommendation of ITU-T G.7044/Y.1347 is applied as the technology for changing the bandwidth, that is, bit rate, of the signal transferring frame containing the data.

Now, with reference to FIG. 1, a description is made of a procedure used to increase a bit rate of a lower order (LO) ODUflex (generic framing procedure (GFP)) signal being the second signal transferring frame containing the data serving as the client signal.

Further, with reference to FIG. 2A, FIG. 2B, and FIG. 2C, a description is made of an outline of an operation performed by each node to increase the bit rate of the LO ODUflex (GFP) signal in accordance with the procedure illustrated in FIG. 1 in the WDM network having a three-node configuration.

In addition, with reference to FIG. 3, a description is made of an outline of processing for each signal or each frame performed to increase the bit rate of the LO ODUflex (GFP) signal.

In the example illustrated in FIG. 1, the bit rate of the LO ODUflex (GFP) signal is increased from a bit rate Bb before a bit rate change to a bit rate Ba after the bit rate change by the following procedure.

(Initial State)

In an initial state, the LO ODUflex (GFP) signal being the second signal transferring frame containing the data serving as the client signal is contained in a frame of a higher order (HO) ODUk signal being the first signal transferring frame for containing and transferring a plurality of low speed ODU signals in a multiplexed manner.

At this time, as illustrated in part (A) of FIG. 3, the LO ODUflex (GFP) signal is contained by using n time slots among a plurality of time slots (TSs) allocated to a signal containing area within the frame of the HO ODUk signal.

In part (A) of FIG. 3 and parts (B) and (C) of FIG. 3 described later, the LO ODUflex (GFP) signal is an interface signal whose bit rate can be set arbitrarily, and is a signal obtained by containing the client signal having a packet format by using generic framing procedure-framed (GFP-F) frame processing.

In part (A) of FIG. 3, ODTUk.n is an intermediate frame generated when the LO ODUflex (GFP) signal is contained into the time slot within the frame of the HO ODUk signal.

Further, in part (A) of FIG. 3 and parts (B) and (C) of FIG. 3 described later, OTUk is a frame obtained by containing the frame of the HO ODUk signal, which contains an LO ODUflex (GFP) signal or contains a plurality of LO ODUflex (GFP) signals in a multiplexed manner, into a signal having one wavelength ($\lambda$).

FIG. 2A illustrates the initial state of the WDM network having a three-node configuration including a transmitting terminal station TO, a relay station RL, and a receiving terminal station RO. The three nodes including the transmitting terminal station TO, the relay station RL, and the receiving terminal station RO are formed of the WDM devices in the optical network system.

In the transmitting terminal station TO, for example, a media access control (MAC) frame of an Ethernet (trademark) is encapsulated into a GFP-F frame as the client signal, and is then contained into the LO ODUflex (GFP) signal. In addition, the LO ODUflex (GFP) signal is contained into the frame of an ODTUk.n signal equivalent to the n time slots within the frame of the HO ODUk signal, to thereby contain the LO ODUflex (GFP) signal into the n time slots within the frame of the HO ODUk signal.

At this time, an LO ODU signal different from the LO ODUflex (GFP) signal can be contained in the frame of the HO ODUk signal in a multiplexed manner. Then, the transmitting terminal station TO plays a role of generating the frame of an OTUk signal obtained by adding an error correcting code (forward error correction (FEC)) and an overhead (OH) signal for supervisory control to the frame of the HO ODUk signal, subjecting the OTUk signal to electrical/optical signal conversion, and transmitting the obtained optical signal as an optical signal (optical wavelength signal) through an optical fiber (optical fiber transmission line).

Subsequently, after receiving the frame of the OTUk signal as the optical signal, the relay station RL performs optical/electric signal conversion, performs an error correction of the frame of the OTUk signal by using the error correcting code of the frame of the OTUk signal, and extracts the frame of the HO ODUk signal. After that, the LO ODUflex (GFP) signal contained in the frame of the ODTUk.n signal is extracted from the frame of the HO ODUk signal, and a route for the LO ODUflex (GFP) signal is changed over by a switch (route changeover switch).

In addition, after the route is changed over, the relay station RL causes the frame of the HO ODUk signal to contain the LO ODUflex (GFP) signal via the frame of the ODTUk.n signal, and then outputs the frame of the OTUk signal to the optical fiber.

Subsequently, the receiving terminal station RO performs the optical/electric signal conversion for the frame of the OTUk signal received as the optical signal, and performs the error correction of the frame by using the error correcting code of the frame of the OTUk signal. After that, the LO ODUflex (GFP) signal contained in the frame of the ODTUk.n signal is extracted from the frame of the HO ODUk signal, and the GFP-F frame is extracted from the LO ODUflex (GFP) signal.

In addition, the receiving terminal station RO extracts the MAC frame from the GFP-F frame, and then outputs the MAC frame to the client device as the client signal.

From a functional viewpoint, the respective nodes illustrated in FIG. 2A and FIGS. 2B and 2C described later include components (a) to (j) described as follows.

The component (a) terminates the client signal to encapsulate the MAC frame into the GFP-F frame, and generates a GFP idle signal when the MAC frame is idle (idle state).

The component (b) causes the LO ODUflex (GFP) signal to contain the GFP-F frame.

The component (c) causes the frame of an ODTUk.ts signal corresponding to the time slot within the frame of the HO ODUk signal to contain the LO ODUflex (GFP) signal while performing frequency adjustment.

In this case, the frequency adjustment is to map the LO ODUflex (GFP) signal to the signal containing area within the frame of the ODTUk.ts signal while inserting a stuff signal (invalid signal) having an amount equivalent to a difference in the bit rate between the LO ODUflex (GFP) signal and the signal containing area within the frame of the ODTUk.ts signal into the signal containing area within the frame of the ODTUk.ts signal so that insertion positions thereof are equally spaced. This mapping technology is recommended as a generic mapping procedure (GMP) by ITU-T G.709/Y.1331.

The component (d) maps the frame of the ODTUk.ts signal containing the LO ODUflex (GFP) signal being the second signal transferring frame having a lower bit rate than the first signal transferring frame to the signal containing area within the frame of the HO ODUk signal being the first signal transferring frame.

Further, the component (d) generates the frame of the OTUk signal obtained by adding the overhead signal for the supervisory control and the error correcting code to the frame of the HO ODUk signal, subjects the OTUk signal to the electrical/optical signal conversion, and outputs the obtained optical signal to the optical fiber.

The component (e) performs the optical/electric signal conversion for the frame of the OTUk signal being the optical signal transmitted through the optical fiber, then performs the error correction of the OTUk signal by using the error correcting code, and splits the ODTUk.ts signal from the frame of the HO ODUk signal being the first signal transferring frame in a multiplexed manner.

The component (f) extracts the LO ODUflex (GFP) signal being the second signal transferring frame from each ODTUk.ts signal. In this case, the LO ODUflex (GFP) signal is extracted while drawing out the stuff signal mapped to the signal containing area within the frame of the ODTUk.ts signal along with this signal. This extraction technology is recommended as the GMP by ITU-T G.709/Y.1331.

The component (g) processes the overhead signal for the supervisory control for the LO ODUflex (GFP) signal, and interfaces with the switch.

The component (h) is a switch for changing over the route for each LO ODU signal.

The component (i) extracts the GFP-F frame from the LO ODUflex (GFP) signal.

In addition, the component (j) extracts the MAC frame encapsulated in the GFP-F frame, and outputs the MAC frame as the client signal.

(Step 1: Increase Number of Time Slots of First Signal Transferring Frame)

First in Step 1 (S1) of a procedure for increasing the bit rate of the LO ODUflex (GFP) signal being the second signal transferring frame from the bit rate Bb before the bit rate change to the bit rate Ba after the bit rate change, the number of time slots (TSs) within the frame of the HO ODUk signal being the first signal transferring frame containing the LO ODUflex (GFP) signal being the second signal transferring frame is increased.

Here, a consideration is given to an exemplary case where the time slots of the HO ODUk signal, the number of which is a number TSb of time slots before the bit rate change being n, are used to contain the LO ODUflex (GFP) signal whose bit rate is the bit rate Bb before the change. Further, a consideration is given to an exemplary case where the time slots of the HO ODUk signal, the number of which is a number TSa of time slots after the bit rate change being n+i, are used to contain the LO ODUflex (GFP) signal whose bit rate is the bit rate Ba after the change.

In preparation for a case where the bit rate of the LO ODUflex (GFP) signal increases to the bit rate Ba after the change, the number of time slots containing the LO ODUflex (GFP) signal is increased from a current value of n (=2) to n+i (=4) obtained by adding i (=2) thereto.

In the respective nodes illustrated in FIG. 2B, the components (d) and (e) within the nodes including the transmitting terminal station TO, the relay station RL, and the receiving terminal station RO perform processing for changing the number of time slots from n to n+i.

As illustrated in part (B) of FIG. 3, by performing the processing for increasing the number of time slots from n to n+i, the intermediate frame ODTUk.n generated when the LO ODUflex (GFP) signal is contained into the time slot within the frame of the HO ODUk signal becomes ODTUk.(n+i).

(Step 2: Cause Increased Time Slots to Contain LO ODUflex (GFP) Signal being Second Signal Transferring Frame)

As Step 2 (S2), processing for causing (n+i) time slots to contain the LO ODUflex (GFP) signal is performed in accordance with the increase in the number of time slots within the frame of an HO ODU signal in Step 1 to n+i.

Specifically, in accordance with the increase in the number of time slots within the frame of the HO ODU signal, a frame size of an ODTUk.(n+i) signal increases to (n+i)/n times as large as that of the ODTUk.n signal in the initial state. Therefore, extraction processing for causing the frame of the ODTUk.(n+i) signal to contain the LO ODUflex (GFP) signal is performed.

It should be noted here that, because there is no change in the bit rate of the LO ODUflex (GFP) signal, the amount of the stuff signal is also increased to approximately (n+i)/n times when the LO ODUflex (GFP) signal is contained into the frame of the ODTUk.(n+i) signal.

In FIG. 2B, this processing is performed by the components (c) and (f) within the nodes including the transmitting terminal station TO, the relay station RL, and the receiving terminal station RO. After it is confirmed that the processing of Step 2 has been completed in all the nodes, the procedure advances to the processing of Step 3.

Further, as illustrated in part (B) of FIG. 3, the LO ODUflex (GFP) signal is contained into n+i time slots in the processing of Step 2.

(Step 3: Increase Bit Rate of LO ODUflex (GFP) Signal being Second Signal Transferring Frame)

In Step 3 (S3), the bit rate of the LO ODUflex (GFP) signal is increased from the bit rate Bb before the change to the bit rate Ba after the change. At this time, the transmitting terminal station TO controls the bit rate of the LO ODUflex (GFP) signal to increase so that the number of bits to be transmitted increases by 8 bits every 125 μs. Therefore, a change speed of the bit rate to be increased is 512 Mbits/s/s (=8 bits/125 μs/125 μs).

FIG. 2C illustrates an operation of each node in Step 3, and the above-mentioned processing for increasing the bit rate is performed by the components (b) and (i) within the nodes. Further, processing for encapsulating the MAC frame into the GFP-F frame and generating a GFP idle signal in accordance with the increase in the bit rate of the LO ODUflex (GFP) signal is performed by the components (a) and (j) within the nodes.

Further, as illustrated in part (C) of FIG. 3, in the processing of Step 3, the bit rate of the LO ODUflex (GFP) signal is increased from the bit rate Bb (2.498 Gbps) before the change to the bit rate Ba (4.997 Gbps) after the change.

As described above, the processing for increasing the bit rate of the LO ODUflex (GFP) signal from the bit rate Bb before the change to the bit rate Ba after the change is performed.

Note that, processing for decreasing the bit rate of the LO ODUflex (GFP) signal from the bit rate Ba after the change to the bit rate Bb before the change is performed by performing processing reverse to the processing for the increase. Next, a procedure for the processing for the decrease is described in brief.

(Step 1A: Notify of Start of Processing for Decreasing Bit Rate)

In Step 1A, all the nodes are notified by the overhead of a start of the processing for decreasing the bit rate of the LO ODUflex (GFP) signal.

(Step 2A: Perform Processing for Decreasing Bit Rate)

In Step 2A, the bit rate of the LO ODUflex (GFP) signal is decreased from the bit rate Ba after the change to the bit rate Bb before the change. At this time, the change speed of the bit rate is set to 512 Mbits/s/s.

(Step 3A: Decrease Number of Time Slots)

In Step 3A, after it is confirmed that the bit rate of the LO ODUflex (GFP) signal has reached a desired value, that is, the bit rate Bb before the change, in the frames of all the HO ODU signals through which the LO ODUflex (GFP) signal passes, the number of time slots within the frame of the HO ODU signal containing this LO ODUflex (GFP) signal is decreased from the number TSa of time slots after the change being n+i to the number TSb of time slots before the change being n. After it is confirmed that the numbers of time slots within the frames of all the HO ODU signals have decreased, bit rate change processing is brought to an end.

As described above, in the case of increasing/decreasing the bit rate of the LO ODUflex (GFP) signal, the change speed of the bit rate is defined as 512 Mbits/s/s.

However, in accordance with this definition, for example, when the LO ODUflex(GFP) signal is changed from the lowest bit rate of 1.249 Gbps defined by ITU-T G.709/Y.1331 to 2.498 Gbps being twice as that, at least approximately 2 seconds (=(2,498 [Mbits/s]−1,249 [Mbits/s])/512 [Mbits/s/s]) is required. Further, when the LO ODUflex(GFP) signal is changed from 1.249 Gbps to the highest bit rate of 104.117 Gbps that is defined currently, at least approximately 200 seconds (=(104,117 [Mbits/s]−1,249 [Mbits/s])/512 [Mbits/s/s]) is required.

On the other hand, if a consideration is given to the MAC frame of the Ethernet (trademark) being a major client signal for the LO ODUflex(GFP) signal, a time required to change the bandwidth when the bandwidth is limited under quality of service (QoS) control is equal to or shorter than sub sec (1 sec).

Accordingly, for example, in order to respond speedily to a request to limit/change the bandwidth of the client signal, it is essential to reduce the time required to change the bit rate of the LO ODUflex(GFP) signal.

According to an aspect of the disclosures made herein, an optical transmission device, which transmits a first frame containing a plurality of second frames, includes a unit that newly adds and allocates, when a bit rate of a specific second frame among the plurality of second frames is to be changed, a time slot corresponding to an increase in the bit rate of the specific second frame to time slots previously set for the plurality of second frames in time slots of the first frame; a unit that inputs a dummy signal as data to the newly-added time slot while performing such a setting that both of: a data writing speed and a data reading speed for the newly-added time slot; and a delay time between writing and reading of the data for the newly-added time slot are in agreement with both of: a data writing speed and a data reading speed for each time slot of the previously-set time slots; and a delay time between writing and reading of the data for each time slot of the previously-set time slots; and a unit that causes the newly-added time slot and the previously-set time slots to contain the plurality of second frames so that the bit rate of the specific second frame is set to a bit rate defined in advance after the agreement.

BRIEF DESCRIPTION OF THE DRAWINGS

FIG. 2B is a diagram for illustrating the outline of the operation performed by each node to increase the bit rate of the LO ODUflex (GFP) signal according to the related art;

FIG. 3 is a diagram for illustrating an outline of processing performed to increase the bit rate of the LO ODUflex (GFP) signal according to the related art;

FIG. 4 is a block diagram illustrating a configuration of an optical network system according to one embodiment;

FIG. 9 is a diagram for illustrating the transfer of the status indicating information according to the one embodiment;

FIG. 10 is a diagram for illustrating an effect of the one embodiment; and

FIG. 11 is a diagram for illustrating the effect of the one embodiment.

DESCRIPTION OF EMBODIMENTS

Figure 1:
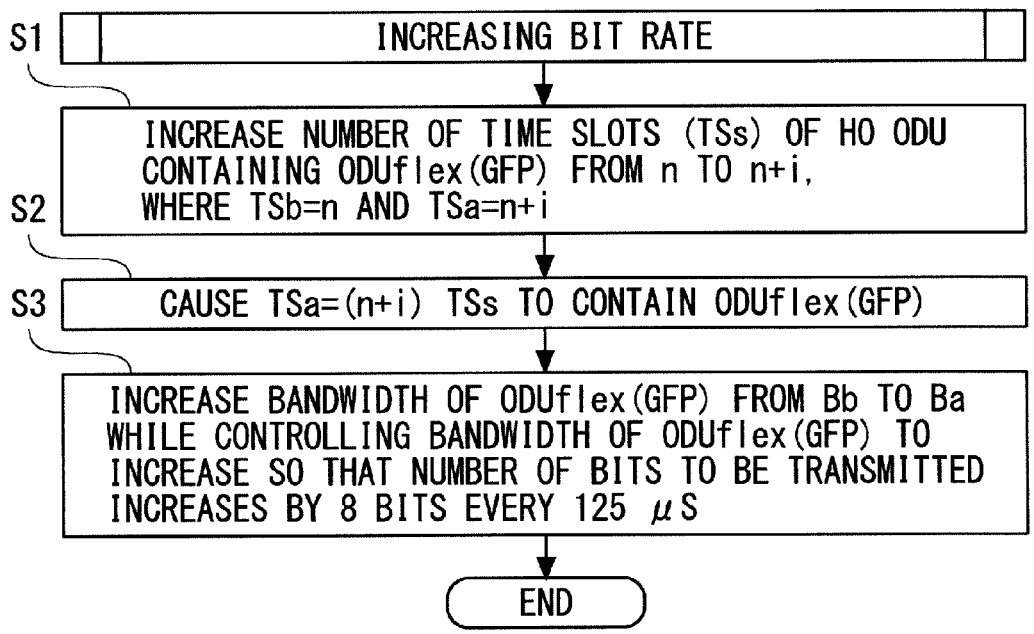
FIG. 1 is a flowchart illustrating a procedure used to increase a bit rate of an LO ODUflex(GFP) signal according to the related art.
Figure 2A:
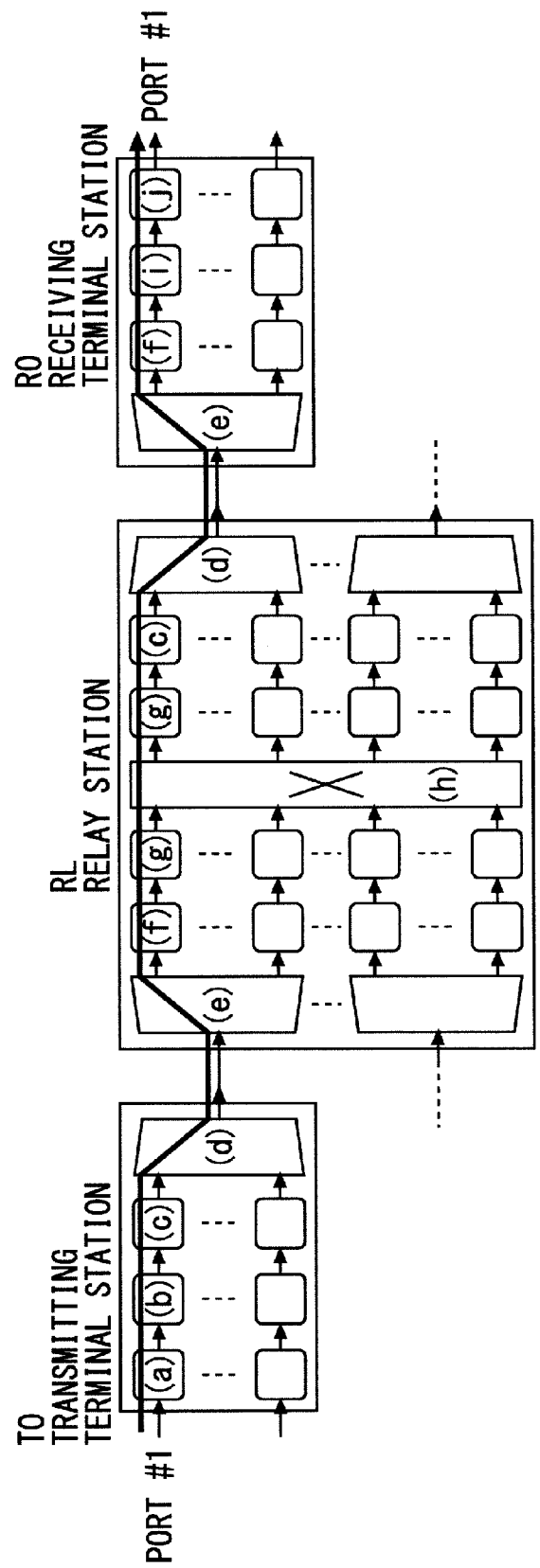
FIG. 2A is a diagram for illustrating an outline of an operation performed by each node to increase the bit rate of the LO ODUflex (GFP) signal according to the related art.
Figure 2C:
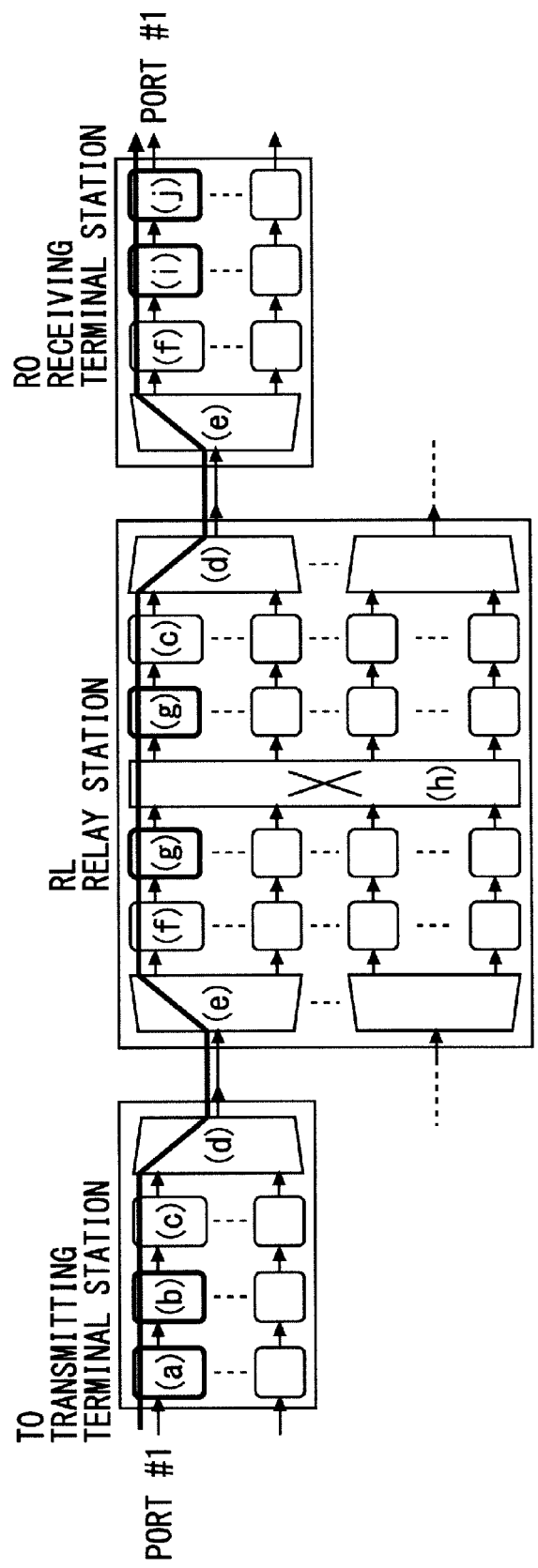
FIG. 2C is a diagram for illustrating the outline of the operation performed by each node to increase the bit rate of the LO ODUflex (GFP) signal according to the related art.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

(Optical Network System)

Referring to FIG. 4 illustrating a configuration example of a system according to one embodiment, an optical network system 1 includes a plurality of WDM devices 3 (3A to 3E), which form a wavelength division multiplexing (WDM) network 2. In the WDM network 2, a WDM signal obtained by subjecting a plurality of optical signals having different wavelengths of at least one wave to wavelength division multiplexing is subjected to transmission (unless otherwise limited, including exchange and transfer).

Those WDM devices 3 are optical transmission devices including a bit rate adjustment function to which a WDM transmission technology conforming to the recommendation of ITU-T G.709/Y.1331 and the recommendation of ITU-T G.7044/Y.1347 can be applied.

The respective WDM devices 3 form communication nodes as a transmitting terminal station, a receiving terminal station, and a relay station. A plurality of optical wavelength paths PS (PS#1 to PS#5) are set in optical fiber transmission lines between those WDM devices 3, and a first signal transferring frame FR#1 is transmitted through those optical wavelength paths PS.

Some of the plurality of WDM devices 3 are connected to an Ethernet (trademark) switch such as a layer 2 (L2) switch or client devices 4 (4A to 4F) such as routers.

Data on the optical signal output from the client device 4 (client signal) is input to the WDM device 3 and contained into a second signal transferring frame FR#2 having a lower bit rate than the first signal transferring frame FR#1. Further, this data is transmitted to the client device 4 corresponding to a desired destination after being contained into a time slot (TS) allocated there to within the first signal transferring frame FR#1 in the WDM device 3. Note that, the term "time slot" is used unless otherwise limited, and the time slot is assumed to include a tributary slot (ts).

In the optical network system 1, the bit rate of the second signal transferring frame FR#2 is determined based on the bit rate of the data, and when the data is contained into the first signal transferring frame FR#1, a number of time slots allocated thereto is determined.

In the example illustrated in FIG. 4, a payload of the first signal transferring frame FR#1 contains the second signal transferring frame FR#2 containing data #1 between the client device 4A and the client device 4D by using two time slots TS#1 and TS#2, and contains the second signal transferring frame FR#2 containing data #2 between the client device 4B and the client device 4E by using one time slot TS#4. In the first signal transferring frame FR#1, overhead (OH) is an overhead signal for supervisory control, and forward error correction (FEC) is an error correcting code.

(WDM Device)

Figure 5:
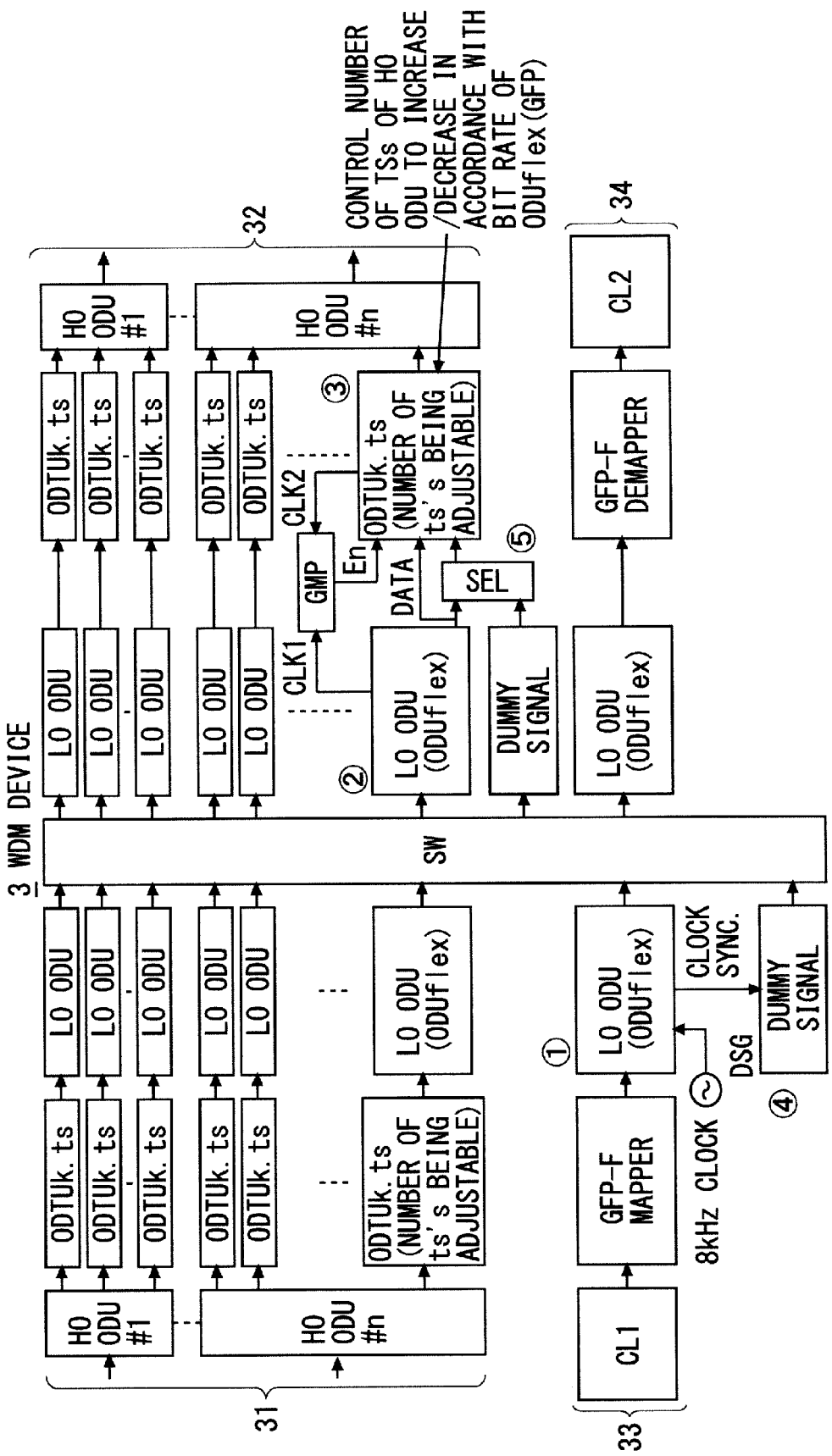
FIG. 5 is a block diagram illustrating a configuration of a WDM device according to the one embodiment.

FIG. 5 illustrates an example of a configuration of the WDM device 3 within the above-mentioned optical network system 1. Referring to FIG. 4 and FIG. 5 together, the WDM devices 3 (3A to 3E) each include a switch SW, a reception frame processing unit 31, a transmission frame processing unit 32, an outgoing frame processing unit 33, and an incoming frame processing unit 34.

The reception frame processing unit 31 at the previous stage of the switch SW includes a plurality of higher order optical channel data units (HO ODU units), a plurality of optical channel data tributary units k with is (tributary slots) (ODTUk.ts units), and a plurality of lower order optical channel data units (LO ODU units). Note that, an optical channel transport unit (OTU unit) is provided at the previous stage of each of the HO ODU units, but is omitted from the drawing.

The transmission frame processing unit 32 at the subsequent stage of the switch SW includes a plurality of HO ODU units, a plurality of ODTUk.ts units, and a plurality of LO ODU units. Note that, an OTU unit is provided at the subsequent stage of each of the HO ODU units, but is omitted from the drawing. In addition, the transmission frame processing unit 32 further includes a generic mapping procedure (GMP) unit and a selector SEL.

Further, the outgoing frame processing unit 33 at the previous stage of the switch SW includes a client signal unit CL1, a generic framing procedure-framed (GFP-F) mapper, an LO ODU unit, and a dummy signal generation unit DSG.

In addition, the incoming frame processing unit 34 at the subsequent stage of the switch SW includes a client signal unit CL2, a GFP-F demapper, and an LO ODU unit.

The switch SW parallelizes an LO ODUflex (GFP) signal into a plurality of portions in units of bytes so as to cause a plurality of time slots to contain the LO ODUflex (GFP) signal, that is, splits the LO ODUflex (GFP) signal in a multiplexed manner by the number of time slots in units of bytes.

The WDM device 3 includes, as other components, an optical amplifier, an optical demultiplexer, an optical switch (optical route changeover switch), an optical multiplexer, an optical signal transmitting/receiving unit on a client device side, an optical signal transmitting/receiving unit on a WDM network side, an optical/electrical (O/E) signal conversion unit, and an electrical/optical (E/O) signal conversion unit, but those components can easily be understood and implemented by a person skilled in the art, and are therefore omitted from the drawing.

The WDM device 3 has an optical add/drop multiplexing (OADM) function for transmitting/receiving the client signal to/from the client device 4 as the optical signal having one wavelength, and for inserting (multiplexing) the optical signal having one wavelength into the WDM signal and branching (splitting) the optical signal having each wavelength from the WDM signal.

By including the reception frame processing unit 31, the transmission frame processing unit 32, the outgoing frame processing unit 33, and the incoming frame processing unit 34, the WDM device 3 can be applied to any one of communication nodes including the transmitting terminal station, the receiving terminal station, and the relay station as described next in brief.

That is, for example, by focusing on the WDM device 3A in FIG. 4, the client signal (data #1) addressed to the client device 4D and transmitted from the client device 4A is terminated by the client signal unit CL1 in the outgoing frame processing unit 33, and is then subjected to outgoing frame processing including mapping processing with respect to a GFP-F frame.

The LO ODUflex (GFP) signal generated by the outgoing frame processing is input to the transmission frame processing unit 32 through the switch SW, and is subjected to transmission frame processing including conversion processing into a signal interface compatible with the WDM network 2.

Then, the WDM signal subjected to the transmission frame processing is transmitted from the WDM device 3A to the WDM device 3B through the optical wavelength path PS#1. The outgoing frame processing and the transmission frame processing are described later in more detail in relation to bit rate adjustment processing.

Further, the client signal (data #1) addressed to the client device 4A and transmitted from the client device 4D is transmitted as the WDM signal from the WDM device 3B to the WDM device 3A through the optical wavelength path PS#1. The WDM signal is subjected to reception frame processing including the conversion processing into the signal interface in the reception frame processing unit 31 of the WDM device 3A.

The LO ODUflex (GFP) signal subjected to the reception frame processing is input to the incoming frame processing unit 34 through the switch SW, and is subjected to incoming frame processing including demapping processing from the GFP-F frame and extraction processing for the client signal performed by the client signal unit CL2.

Then, the client signal subjected to the incoming frame processing is transmitted to the client device 4A.

In addition, in a case where the WDM signal is relayed by the WDM device 3A, the WDM signal is subjected to the above-mentioned reception frame processing in the reception frame processing unit 31, then input to the transmission frame processing unit 32 through the switch SW, and subjected to the above-mentioned transmission frame processing.

Then, the WDM signal subjected to the transmission frame processing is transmitted from the WDM device 3A to another WDM device 3 (for example, 3D) through the optical wavelength path PS#3.

Note that, the WDM device 3 that can be applied to any one of the communication nodes including the transmitting terminal station, the receiving terminal station, and the relay station includes functionally the same components (a) to (j) as in the related art except functions relating to circled numbers 1, 2, 3, 4, and 5 in FIG. 5.

(Bit Rate Adjustment Processing)

Next, an example of the bit rate adjustment (change) processing performed by the WDM device 3 of the optical network system 1 according to the one embodiment is described with reference to the related figures.

In order to realize a reduction in a change time for the bit rate of the LO ODUflex (GFP) signal being the second signal transferring frame FR#2 containing the client signal, attention is focused on the following feature points.

In other words, the LO ODUflex (GFP) signal is always contained into an arbitrary specific number of time slots (hereinafter sometimes referred to simply as "TS") within the frame of an HO ODU signal being the first signal transferring frame FR#1.

Further, the number of TSs changes in accordance with a change amount of the bit rate of the LO ODUflex (GFP) signal on a one-to-one basis.

In addition, a TS-basis GMP containment technology is employed to cause the specific number of TSs to contain the LO ODUflex (GFP) signal, and GMPs corresponding to the specific number of TSs operate synchronously. In this case, the GMP processing corresponds to the GMP defined by the recommendation of ITU-T G.709/Y.1331.

Processing examples described below focus on those feature points. Note that, a bit rate Ba after a bit rate change, a bit rate Bb before the bit rate change, a number TSa of time slots after the bit rate change, and a number TSb of time slots before the bit rate change are sometimes referred to merely by the reference symbols.

Figure 6:
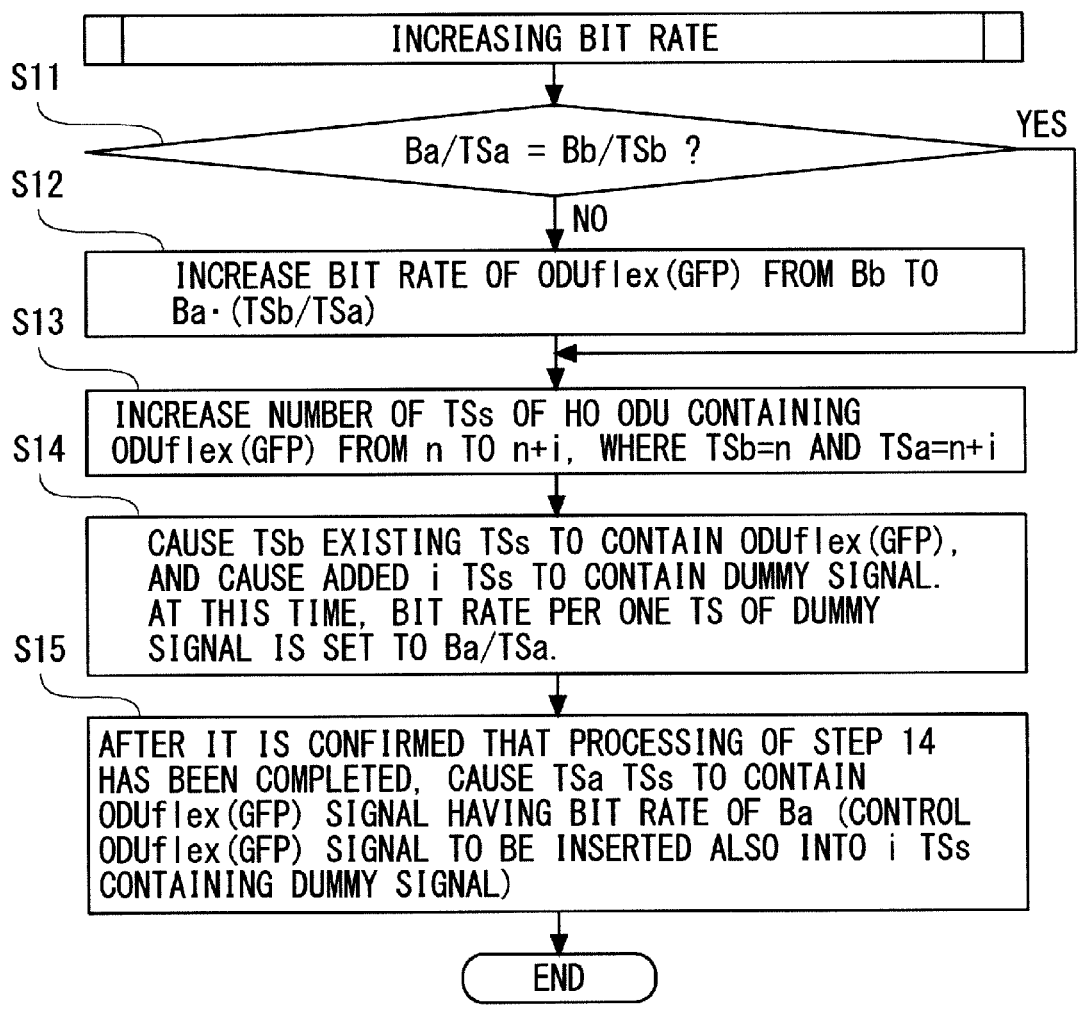
FIG. 6 is a flowchart illustrating a procedure used to increase the bit rate of the LO ODUflex (GFP) signal according to the one embodiment.

With reference to FIG. 6, a description is made of a procedure used to increase the bit rate (bandwidth) of the LO ODUflex (GFP) signal containing the data serving as the client signal in the WDM device 3 illustrated in FIG. 5.

In an example described below, the bit rate of the LO ODUflex (GFP) signal is increased from the bit rate Bb before the bit rate change to the bit rate Ba after the bit rate change (where Bb<Ba). At this time, it is assumed that the number of time slots within the frame of the HO ODU signal containing the LO ODUflex (GFP) signal changes from the number TSb of time slots before the bit rate change being n to the number TSa of time slots after the bit rate change being n+i in accordance with the increase in the bit rate.

(Step 11: Examine Whether or not Bit Rates Before and after Change Exhibit Integer Ratio)

In Step 11 (S11) relating to the circled numbers 1 and 2 in FIG. 5, in the case where the bit rate of the LO ODUflex (GFP) signal is changed from the bit rate Bb before the change to the bit rate Ba after the change, it is examined whether or not the bit rate Ba after the change and the bit rate Bb before the change exhibit a relationship of an integer ratio.

As an example of this examination, it is examined whether Ba/TSa=Bb/TSb or Ba/TSa≠Bb/TSb. In the former case, the bit rates Ba and Bb exhibit an integer ratio, and hence the procedure advances to Step 13. In the latter case, the bit rates Ba and Bb are not expressed by the integer ratio, and hence the procedure advances to Step 12.

Step 11 is performed, when the LO ODUflex (GFP) signal is contained into the specific number of TSs within the frame of the HO ODU signal, in order to split the LO ODUflex (GFP) signal into the previously-set number of time slots in a multiplexed manner, cause the frame of the HO ODU signal to contain the LO ODUflex (GFP) signal in units of TSs by using the GMP, and handle the GMPs corresponding to the number of TSs operating synchronously.

(Step 12: Adjust Bit Rate of LO ODUflex (GFP) Signal)

In Step 12 (S12) relating to the circled numbers 1 and 2 in FIG. 5, the bit rate of the LO ODUflex (GFP) signal is increased from Bb to Ba×(TSb/TSa).

At this time, as an example of a method of increasing the bit rate, it is possible to employ the method of controlling the bit rate of the LO ODUflex (GFP) signal to increase so that the number of bits to be transmitted increases by 8 bits every 125 µs in the same manner as in the above-mentioned related art. Therefore, an increase speed of the bit rate is 512 Mbits/s/s (=8 bits/125 µs/125 µs).

(Step 13: Increase Number of Time Slots within Frame of HO ODU Signal Containing LO ODUflex(GFP) Signal)

In Step 13 (S13) relating to the circled number 3 in FIG. 5, the number of time slots within the frame of an HO ODUk signal containing the LO ODUflex(GFP) signal is increased from the number TSb of time slots before the change being n to the number TSa of time slots after the change being n+i.

At this time, the ODTUk.ts unit within the transmission frame processing unit 32 in FIG. 5 generates an intermediate frame ODTUk.ts when the LO ODUflex(GFP) signal is contained into the time slot (tributary slot) within the frame of the HO ODU signal.

(Step 14: Cause Newly-Added TS to Contain Dummy Signal)

In Step 14 (S14) relating to the circled number 4 in FIG. 5, a dummy signal is contained into the newly-added TS set in Step 13 described above. At this time, it is preconditioned that the bit rate per TS of the dummy signal is the same as the bit rate per TS containing the previously-set (existing) LO ODUflex (GFP) signal and that the GMPs provided in units of n+i TSs all operate synchronously. In other words, the bit rate per TS is Ba/TSa. In all the nodes, after it is confirmed that the processing of Step 14 has been completed, the procedure advances to the processing of Step 15.

Note that, the dummy signal is generated by the dummy signal generation unit DSG in the outgoing frame processing unit 33 based on the LO ODUflex (GFP) signal received from the LO ODU (ODUflex) unit.

(Step 15: Cause Existing TS and Newly-Added TS to Contain LO ODUflex (GFP) Signal)

In Step 15 (S15) relating to the circled number 5 in FIG. 5, the bit rate of the LO ODUflex (GFP) signal is changed from Ba×(TSb/TSa) to Ba, and the LO ODUflex (GFP) signal is contained into TSa=(n+i) time slots. In other words, the LO ODUflex (GFP) signal is controlled to be inserted also into i TSs containing the dummy signal in Step 14.

Subsequently, the processing of Step 13, Step 14, and Step 15 described above is described further in detail with reference to FIG. 7A, FIG. 7B, and FIG. 7C.

Figure 7A:
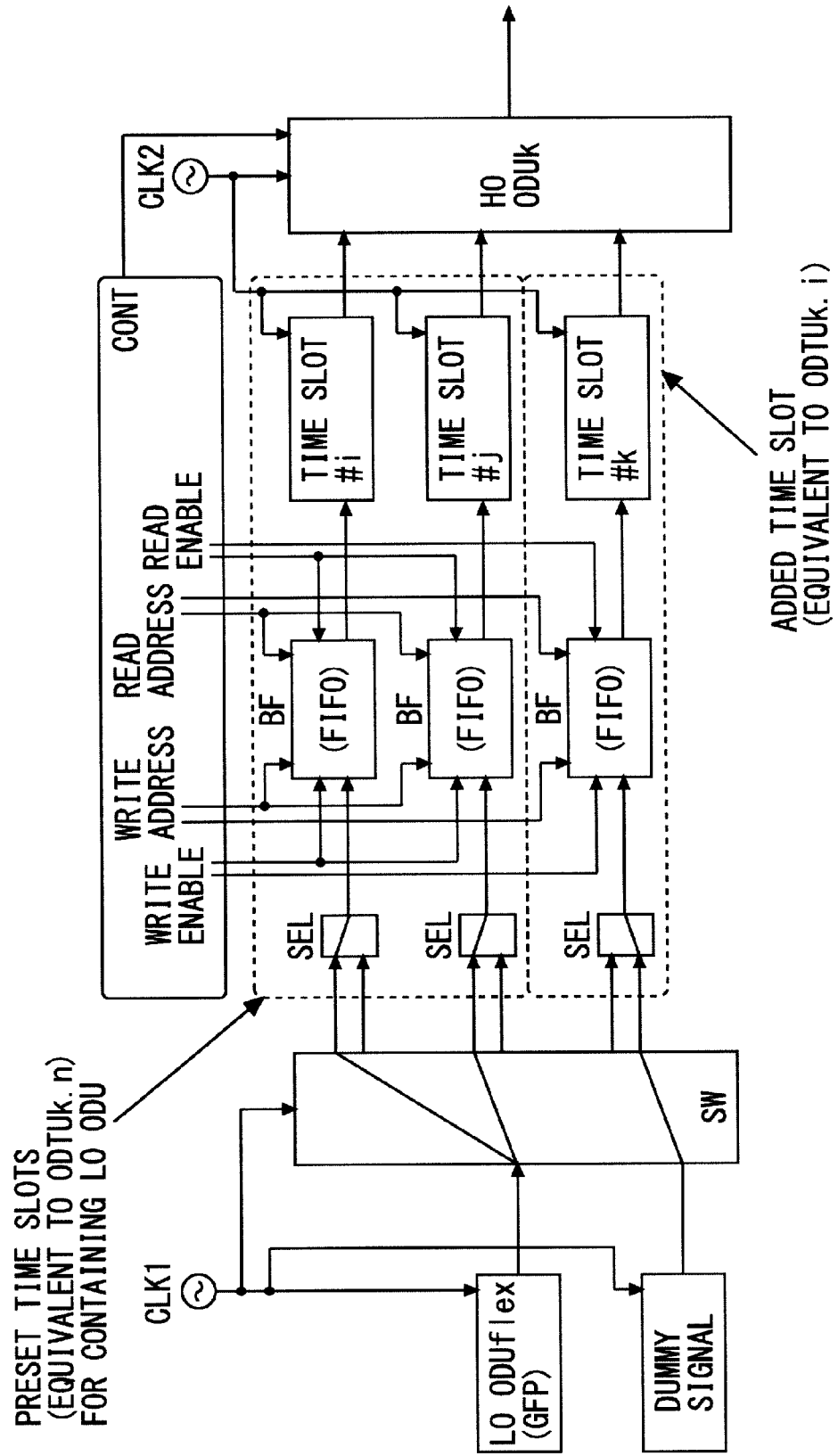
FIG. 7A is a diagram for illustrating processing performed to increase the bit rate of the LO ODUflex (GFP) signal according to the one embodiment.

FIG. 7A relating to the processing of Step 13 described above illustrates an initial state of the increase in the bit rate on the assumption that the LO ODUflex (GFP) signal is contained into the HO ODU signal by occupying two time slots of a time slot #i and a time slot #j and that a time slot #k is added in order to increase the bit rate of the LO ODUflex (GFP) signal.

This makes an example of (n+i)=3 because the number n of previously-set time slots (equivalent to ODTUk.n) is two and the number i of added time slots (equivalent to ODTUk.i) is one. The LO ODUflex (GFP) signal is parallelized into two portions in units of bytes so as to be contained into two time slots via the switch SW, that is, split in a multiplexed manner into the previously-set number of time slots in units of bytes. The signals parallelized into the two portions are each stored into a buffer BF of a first-in first-out (FIFO) via the selector SEL, and are then contained into (mapped to) the time slots #i and #j within the frame of the HO ODUk signal, respectively. In this case, the selector SEL functions to change over the signal to be contained into each time slot between the dummy signal and the LO ODUflex (GFP) signal.

When being stored into each buffer BF for each time slot, the LO ODUflex (GFP) signal is written at a timing at which a write enable signal WEn received from a controller CONT corresponding to an arithmetic operation unit of the GMP unit becomes an enabled state. At this time, an address being a written location on the buffer BF is determined by a write address signal WA received from the controller CONT.

The write enable signal WEn is the same as a clock CLK1 of the LO ODUflex (GFP) signal, and the write address signal WA is incremented by one each time the write enable signal WEn becomes an enabled state. The same signal is used as each of the write address signal WA and the write enable signal WEn for the buffers BF corresponding to the time slot #i and the time slot #j, and the writing to the buffers BF corresponding to the time slot #i and the time slot #j is performed synchronously.

Further, when the LO ODUflex (GFP) signal is read from each buffer BF to be written to each time slot, a read enable signal REn is the same as a clock CLK2 of the ODTUk.ts signal, and is generated by the GMP processing defined by the recommendation of ITU-T G.709/Y.1331. A read address signal RA for the buffer BF is determined by the bit rate of the time slot and the bit rate of the LO ODUflex (GFP) signal. Then, in the buffer BF, data is read from a location designated as a read address, and the read address is incremented by one each time the read enable signal REn becomes an enabled state.

Reading operations from the buffers BF corresponding to the time slot #i and the time slot #j based on the read enable signal REn and the read address signal RA are performed synchronously in the same manner as the writing operations based on the write enable signal WEn and the write address signal WA. On the other hand, for the buffer BF corresponding to the added time slot #k, operations based on the write enable signal WEn, the write address signal WA, the read enable signal REn, and the read address signal RA are performed independently of the time slots #i and #j.

Figure 7B:
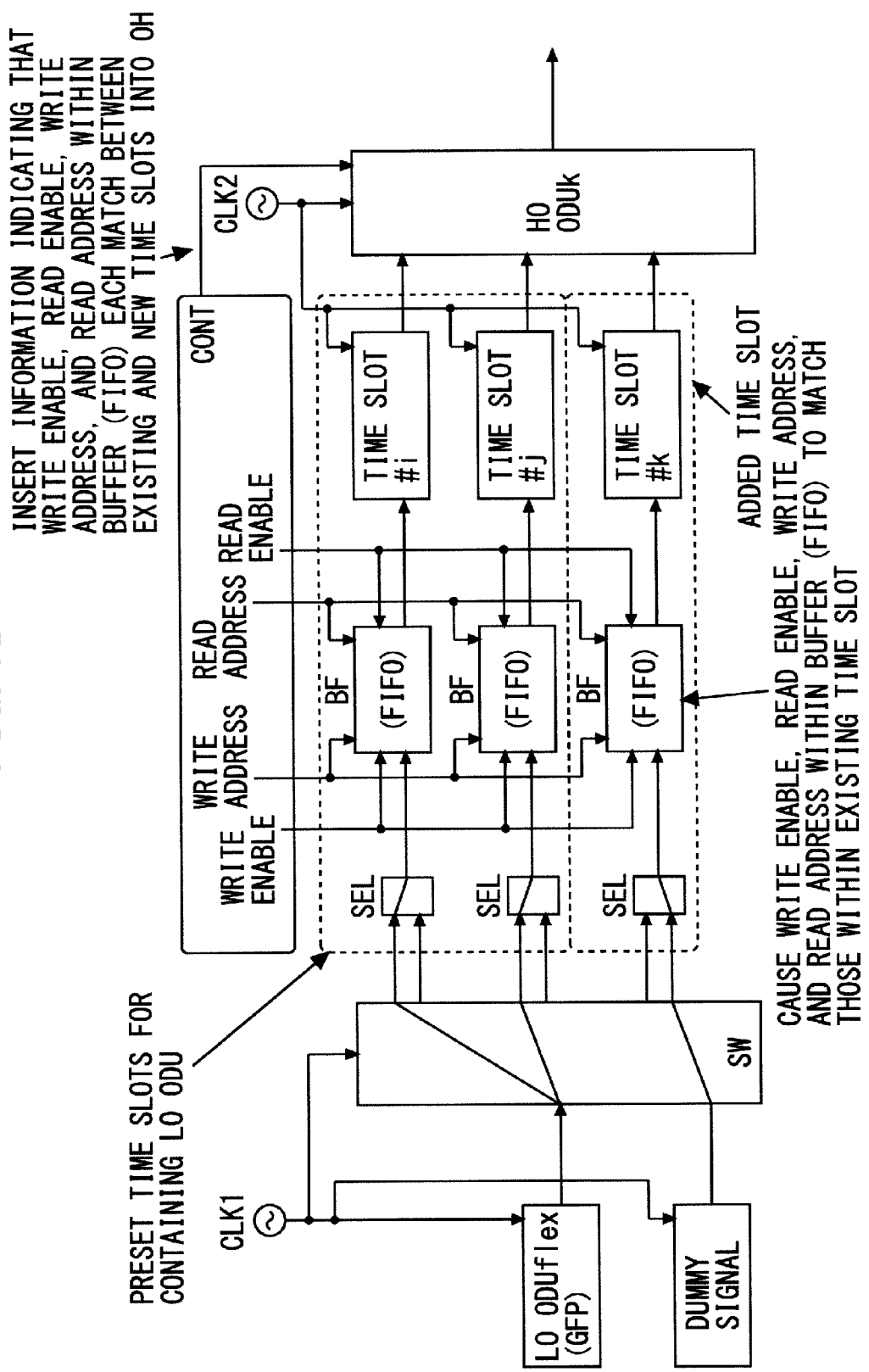
FIG. 7B is a diagram for illustrating the processing performed to increase the bit rate of the LO ODUflex (GFP) signal according to the one embodiment.

FIG. 7B relating to the processing of Step 14 described above illustrates a state in which the number of time slots is increased from the number TSb of time slots before the change being n to the number TSa of time slots after the change being n+i (where n=2 and i=1).

In FIG. 7A described above, different signals are used as each of the write enable signal WEn, the write address signal WA, the read enable signal REn, and the read address signal RA between the buffers BF corresponding to the previously-set (existing) time slots #i and #j and the buffer BF corresponding to the added time slot #k.

However, in FIG. 7B, the controller CONT controls each of the write enable signal WEn, the write address signal WA, the read enable signal REn, and the read address signal RA to be the same signal for all the buffers BF corresponding to the time slots #i, #j, and #k so that all the buffer BF for the time slots #i, #j, and #k operate synchronously.

In this state, the write enable signal WEn and the read enable signal REn are each in agreement between the buffers BF corresponding to the previously-set and added time slots, with the result that a writing speed for data and a reading speed for data are each in agreement among the respective time slots. Further, the write address signal WA and the read address signal RA are each in agreement among the buffers BF, with the result that a delay time between writing and reading of the data is in agreement among the respective time slots.

Note that, the selector SEL for changing over the signal to be contained into each time slot between the LO ODUflex (GFP) signal and the dummy signal is set by the controller CONT to cause the added time slot #k to contain the dummy signal. After this setting is completed, the controller CONT inserts information (status indicating information) indicating that the write enable signal WEn, the write address signal WA, the read enable signal REn, and the read address signal RA for the respective buffers BF are each in agreement between the previously-set and newly-added time slots into the overhead OH added to the HO ODUk signal being the first signal transferring frame FR#1, and transfers the information to the subsequent node as described later in detail.

Figure 7C:
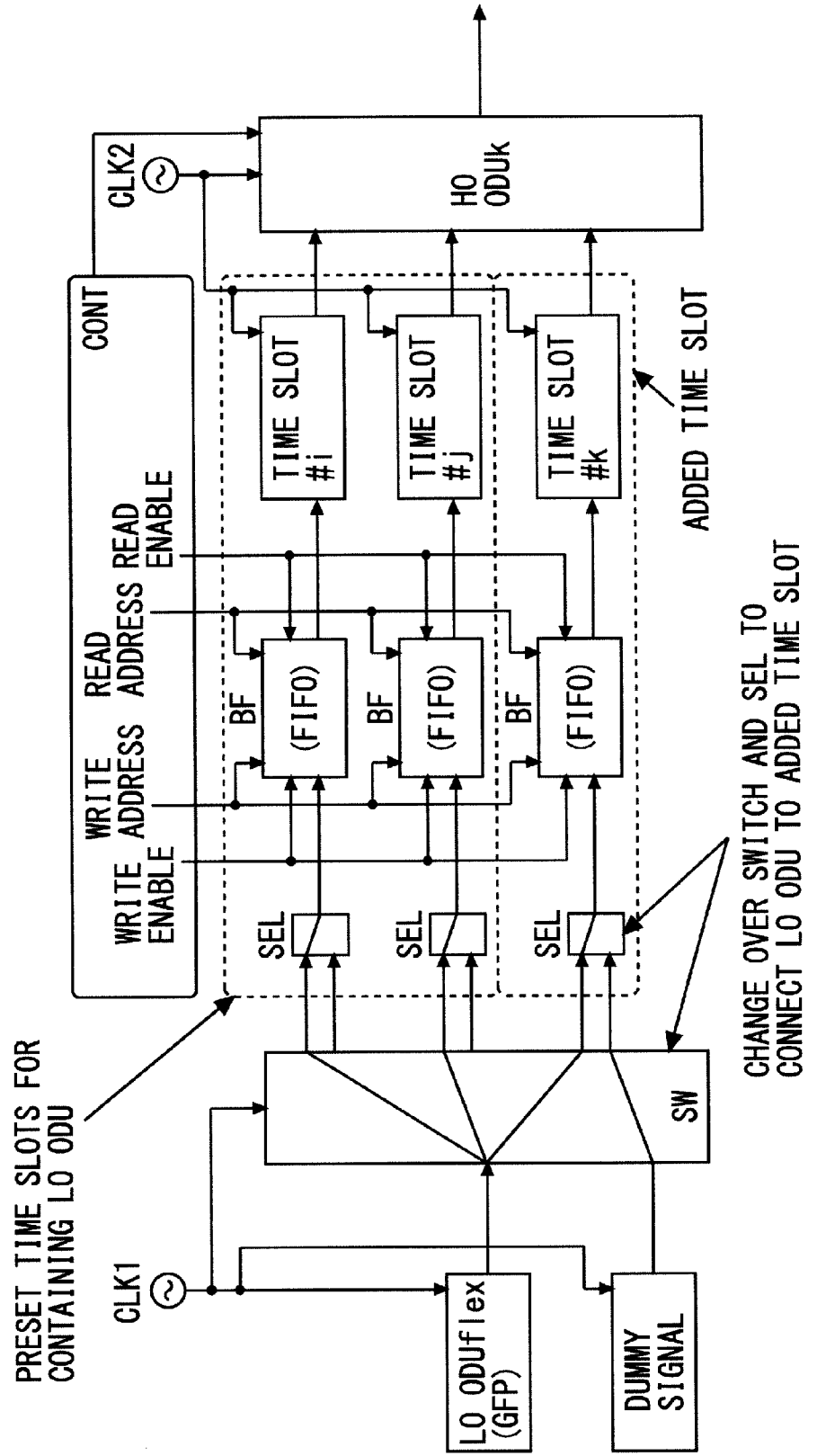
FIG. 7C is a diagram for illustrating the processing performed to increase the bit rate of the LO ODUflex (GFP) signal according to the one embodiment.

In the example illustrated in FIG. 7C relating to the processing of Step 15 described above, the LO ODUflex (GFP) signal is parallelized into three portions in units of bytes by the switch SW so as to be contained into three time slots instead of the two time slots via the switch SW. Further, the selector SEL corresponding to the time slot #k has a selection state changed over from the dummy signal to the LO ODUflex (GFP) signal.

Figure 7D:
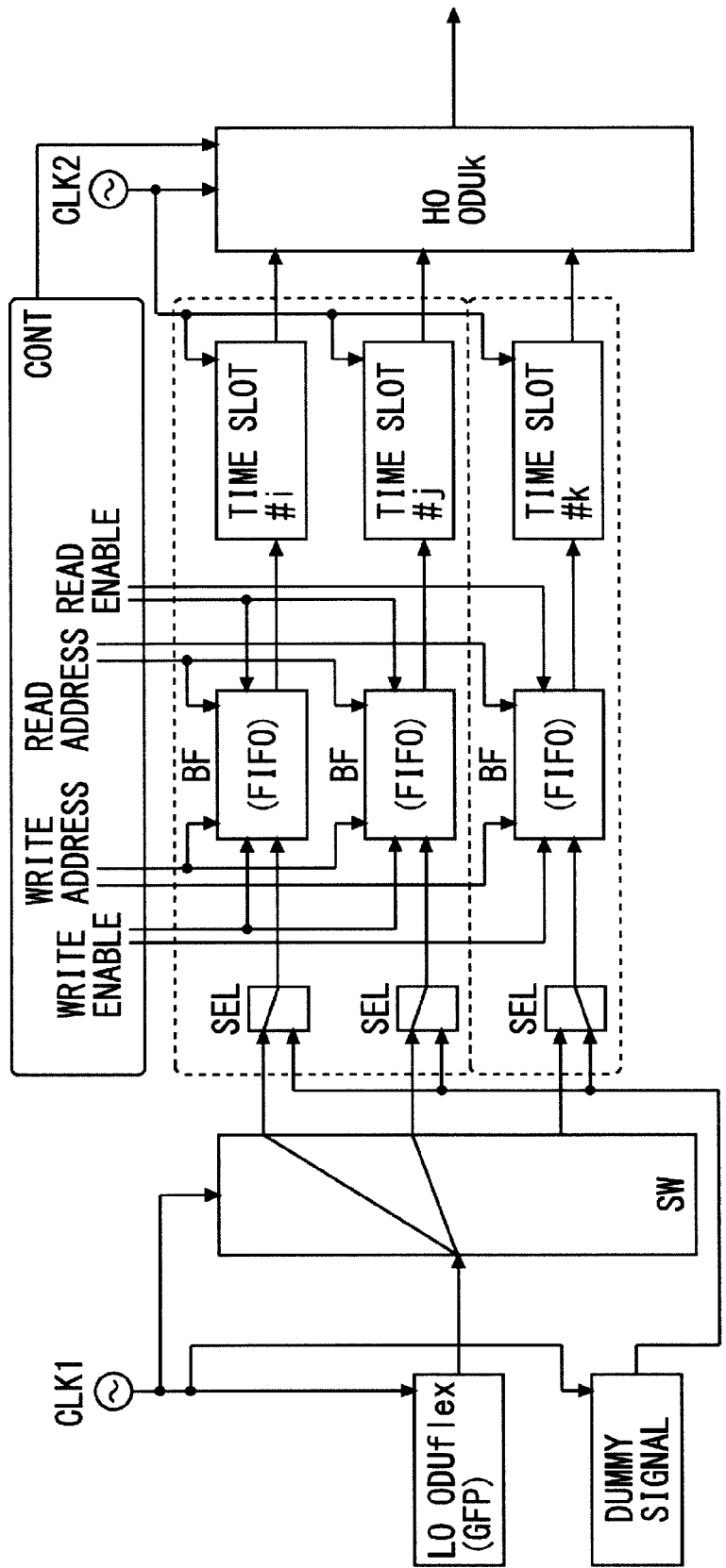
FIG. 7D is a diagram for illustrating the processing performed to increase the bit rate of the LO ODUflex (GFP) signal according to the one embodiment.

Note that, FIG. 5, FIG. 7A, FIG. 7B, and FIG. 7C illustrate the configuration in which the dummy signal is connected to the selector SEL via the switch SW, but, as illustrated in FIG. 7D, a configuration in which the dummy signal is directly connected to the selector SEL without the intermediation of the switch SW may be employed.

Figure 8:
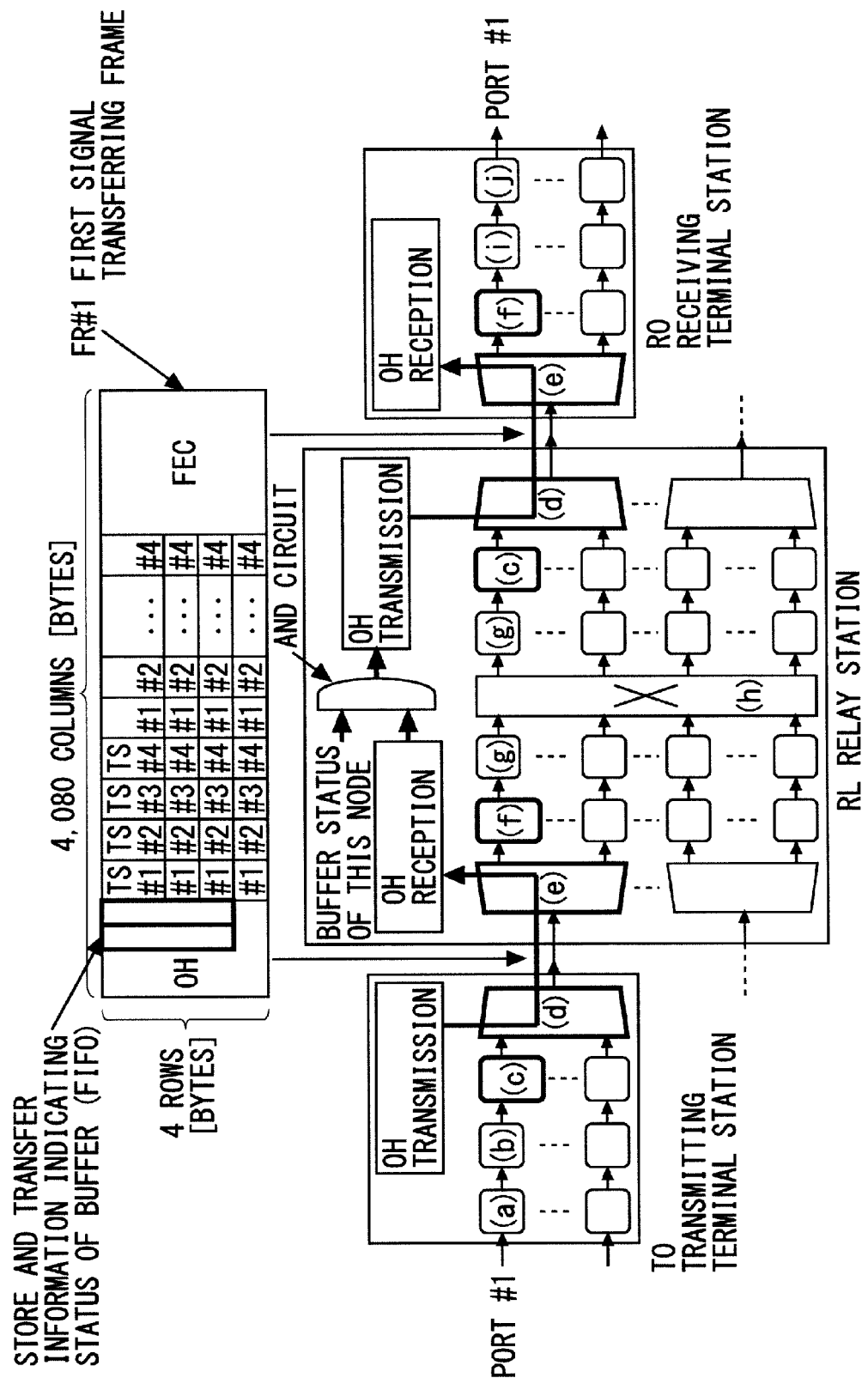
FIG. 8 is a diagram for illustrating transfer of status indicating information according to the one embodiment.

Referring to FIG. 8 for illustrating the transfer of the above-mentioned status indicating information, the controller CONT within a transmitting terminal station TO inserts the status indicating information into the overhead OH of the first signal transferring frame FR#1 (in this case, 4 rows (bytes) and 4,080 columns (bytes)), and transfers the first signal transferring frame FR#1 as an OTU frame to a relay station RL of the subsequent node.

As a specific location within the overhead OH for inserting the status indicating information, for example, it is possible to use a vacant bit information area within a link connection resize overhead of a resize control overhead defined by the recommendation of ITU-T G.7044/Y.1347.

In other words, as exemplified in FIG. 9, as the status indicating information indicating a buffer status corresponding to the time slot, a tributary slot buffer status (TSBS) bit can be defined in the third bit on the fifteenth column and the second row of the link connection resize overhead within the resize control overhead within the overhead OH of the first signal transferring frame FR#1. Then, the controller CONT transmits TSBS=1 when the buffer statuses corresponding to all the time slots that contain the LO ODUflex (GFP) signal are in agreement with one another, and transmits TSBS=0 when the buffer statuses are not in agreement with one another.

Referring again to FIG. 8, TSBS=1 transferred as overhead (OH) information by an overhead (OH) transmitting function of the controller CONT within the transmitting terminal station TO is received by an OH receiving function of the controller CONT within the relay station RL.

The controller CONT within the relay station RL uses an AND circuit to calculate a logical product (AND) between TSBS=1 being the received information and the status indicating information indicating the buffer status corresponding to the time slot within the relay station RL, and then uses the OH transmitting function to transfer the information on the TSBS to the node at the subsequent stage. Note that, when the received TSBS is 1 and the buffer statuses within the relay station RL are in agreement with one another, TSBS=1 corresponding to an AND result of "1" is transferred, and otherwise, TSBS=0 corresponding to an AND result of "0" is transferred.

The controller CONT within a receiving terminal station RO uses the OH receiving function to receive the information on the TSBS transferred through a plurality of the relay stations RL in a hop-by-hop manner. At this time, when receiving TSBS=1, the controller CONT within the receiving terminal station RO can confirm that the writing speed for data and the reading speed for data for all the time slots that contain the LO ODUflex (GFP) signal of interest are each in agreement and the delay time between the writing and reading of the data is in agreement among all the nodes through which the LO ODUflex (GFP) signal being the second signal transferring frame FR#2 passes.

As described above, the processing for increasing the bit rate of the LO ODUflex (GFP) signal from the bit rate Bb before the change to the bit rate Ba after the change is performed.

Note that, the processing for decreasing the bit rate of the LO ODUflex (GFP) signal from the bit rate Ba after the change to the bit rate Bb before the change is performed in accordance with the following procedure. The procedure for the processing for the decrease is described in brief.

(Step 11A: Notify of Start of Processing for Decreasing Bit Rate)

In Step 11A, all the nodes are notified by the overhead OH of a start of the processing for decreasing the bit rate of the LO ODUflex (GFP) signal.

(Step 12A: Examine Whether or not Bit Rates Before and after Change Exhibit Integer Ratio)

In Step 12A, in the case where the bit rate of the LO ODUflex (GFP) signal is changed from the bit rate Ba after the change to the bit rate Bb before the change, it is examined whether or not Ba and Bb exhibit a relationship of an integer ratio. As an example of this examination, it is examined whether Ba/TSa=Bb/TSb or Ba/TSa≠Bb/TSb. In the former case, the relationship between Ba and Bb is an integer ratio, and hence the procedure advances to Step 13A. In the latter case, the relationship between Ba and Bb is not expressed as an integer ratio, and hence the procedure advances to Step 14A.

(Step 13A: Adjust Bit Rate)

In Step 13A, the bit rate of the LO ODUflex (GFP) signal is decreased from Ba to Bb×(TSa/TSb).

(Step 14A: Decrease Bit Rate and Number of Time Slots)

In Step 14A, the bit rate of the LO ODUflex (GFP) signal is decreased to Bb, and at the same time, for the frames of all the HO ODU signals through which the LO ODUflex (GFP) signal passes, the number of TSs containing the LO ODUflex (GFP) signal of interest is decreased from the number TSa of time slots after the change being n+i to the number TSb of time slots before the change being n. After it is confirmed that the number of TSs has been decreased for the frames of all the HO ODU signals, the bit rate change processing is brought to an end.

(Effect of One Embodiment)

Figure 10:
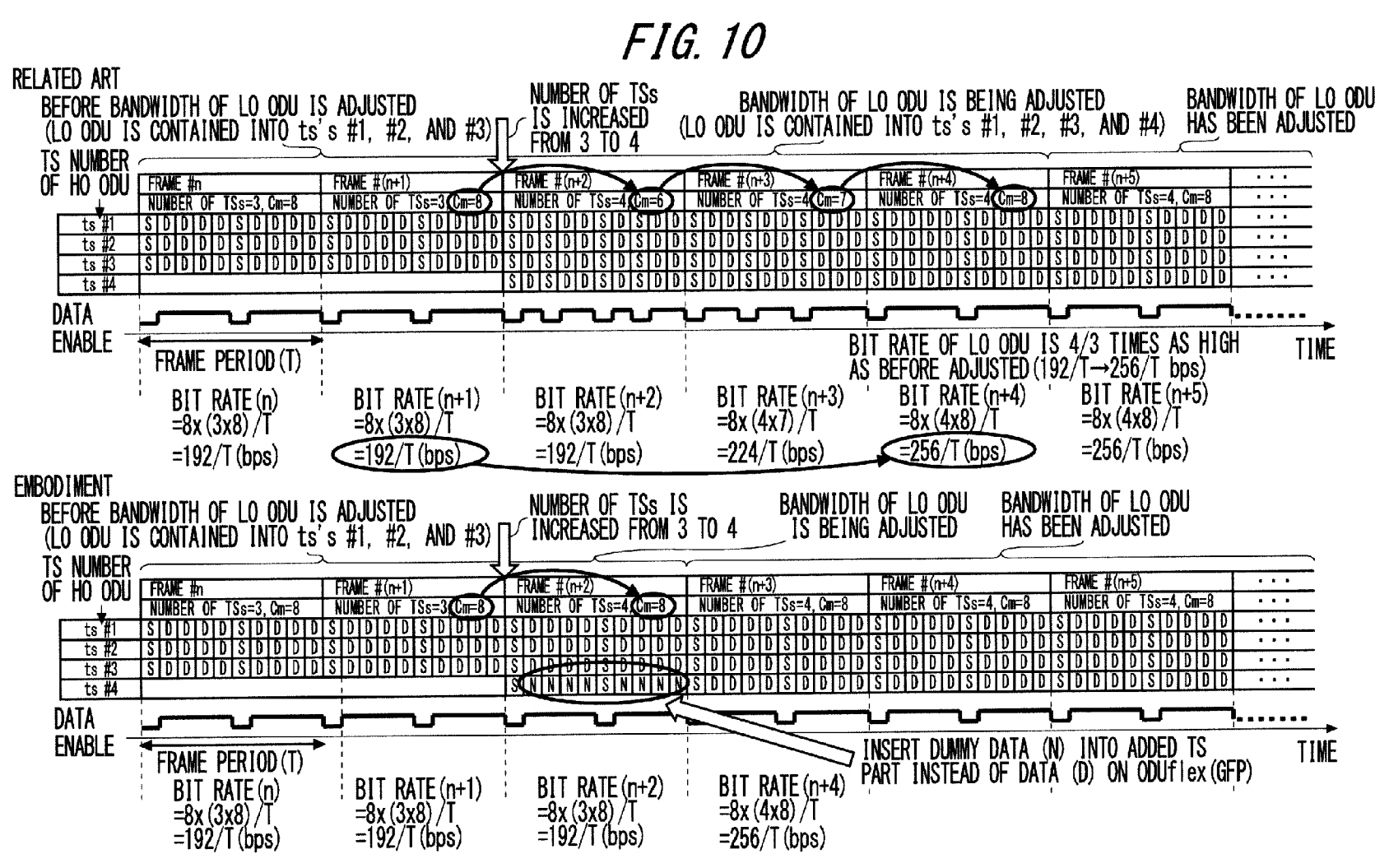

FIG. 10 illustrates an example of data mapping used when the LO ODUflex (GFP) signal is contained into each TS within the frame of the HO ODU signal according to the one embodiment and the related art. FIG. 10 illustrates a case of increasing the number of TSs from 3 to 4 as an example.

Further, FIG. 11 illustrates how the number of TSs within the frame of the HO ODU signal containing the LO ODUflex (GFP) signal and the bit rate of the LO ODUflex (GFP) signal change according to the one embodiment and the related art.

In FIG. 10 and FIG. 11, Cn represents the bit rate of the LO ODUflex (GFP) signal, and Cm represents the number of bytes (data amount) of the LO ODUflex (GFP) signal contained per TS.

In the WDM device 3 according to the one embodiment, the time required to change the increase/decrease in the number of TSs within the frame of the HO ODU signal is realized by the time equivalent to the related art.

Further, in the WDM device 3 according to the one embodiment, the time required to change the increase/decrease in the bit rate of the LO ODUflex (GFP) signal itself can be realized by the time equivalent to an optical channel payload unit k (OPUk) multiframe time being a unit time used when the LO ODUflex (GFP) signal is contained into the frame of the HO ODU signal, and has a value of approximately 100 μs.

On the other hand, in the related art, the transmission bits increase/decrease by 8 bits every 125 μs (equivalent to 512 Mbits/s/s), and hence a necessary change time t is expressed as t=|Ba−Bb|/512M (sec) where the bit rate before the change is Bb (bit/s) and the bit rate after the change is Ba (bit/s).

As a result, in the related art, approximately 2 seconds is required to change the bit rate from 1.249 Gbps to 2.498 Gbps, and approximately 200 seconds is required to change the bit rate from 1.249 Gbps to 104.117 Gbps.

However, in the WDM device 3 according to the one embodiment, both the changes can be realized with approximately 100 μs. According to the one embodiment, the change time is equivalent to approximately 1/20,000 in the former case, and equivalent to approximately 1/2,000,000 in the latter case, which can change the bit rate, that is, the bandwidth far more speedily than in the related art.

According to the disclosed optical transmission device including the bit rate adjustment function, it is possible to reduce the time required to change a bit rate of an LO ODUflex (GFP) signal being the second signal transferring frame.

MODIFIED EXAMPLE

The processing of the embodiment described above is provided as a computer-executable program, and can be provided by a non-transitory computer readable recording medium such as a CD-ROM or a flexible disk or via a communication line.

An arbitrary plurality of or all the processes of the embodiment described above can be selected and combined to be carried out.

What is claimed is:

1. An optical transmission device for transmitting a first frame containing a plurality of second frames, comprising:
a unit that newly adds and allocates, when a bit rate of a specific second frame among the plurality of second frames is to be changed, a time slot corresponding to an increase in the bit rate of the specific second frame to time slots previously set for the plurality of second frames in time slots of the first frame;
a unit that inputs a dummy signal as data to the newly-added time slot while performing such a setting that both of: a data writing speed and a data reading speed for the newly-added time slot; and a delay time between writing and reading of the data for the newly-added time slot are in agreement with both of: a data writing speed and a data reading speed for each time slot of the previously-set time slots; and a delay time between writing and reading of the data for each time slot of the previously-set time slots; and
a unit that causes the newly-added time slot and the previously-set time slots to contain the plurality of second frames so that the bit rate of the specific second frame is set to a bit rate defined in advance after the agreement.

2. The optical transmission device according to claim 1, further comprising a unit that examines, when the bit rate before a bit rate change of the specific second frame is defined as Bb and the bit rate after the bit rate change of the specific second frame is defined as Ba, whether the bit rate Bb before the bit rate change and the bit rate Ba after the bit rate change exhibit an integer ratio.

3. The optical transmission device according to claim 2, further comprising a unit that changes, when a relationship of Bb/TSb≠Ba/TSa is established where a number of time slots before the bit rate change of the specific second frame is defined as TSb and a number of time slots after the bit rate change of the specific second frame is defined as TSa, the bit rate of the specific second frame by Ba×(TSb/TSa)−Bb before the newly-added time slot is allocated to the time slot of the first frame.

4. The optical transmission device according to claim 1, further comprising a unit that transmits information for causing all nodes to which the second frames are transmitted to confirm the agreement.

5. A bit rate adjustment method executed by an optical transmission device for transmitting a first frame containing a plurality of second frames, comprising:
newly adding and allocating, when a bit rate of a specific second frame among the plurality of second frames is to be changed, a time slot corresponding to an increase in the bit rate of the specific second frame to time slots previously set for the plurality of second frames in time slots of the first frame;
inputting a dummy signal as data to the newly-added time slot while performing such a setting that both of: a data writing speed and a data reading speed for the newly-added time slot; and a delay time between writing and reading of the data for the newly-added time slot are in agreement with both of: a data writing speed and a data reading speed for each time slot of the previously-set time slots; and a delay time between writing and reading of the data for each time slot of the previously-set time slots; and
causing the newly-added time slot and the previously-set time slots to contain the plurality of second frames so that the bit rate of the specific second frame is set to a bit rate defined in advance after the agreement.

6. The bit rate adjustment method according to claim 5, further comprising examining, when the bit rate before a bit rate change of the specific second frame is defined as Bb and the bit rate after the bit rate change of the specific second frame is defined as Ba, whether the bit rate Bb before the bit rate change and the bit rate Ba after the bit rate change exhibit an integer ratio.

7. The bit rate adjustment method according to claim 6, further comprising changing, when a relationship of Bb/TSb≠Ba/TSa is established where a number of time slots before the bit rate change of the specific second frame is defined as TSb and a number of time slots after the bit rate change of the specific second frame is defined as TSa, the bit rate of the specific second frame by Ba×(TSb/TSa)−Bb before the newly-added time slot is allocated to the time slot of the first frame.

8. The bit rate adjustment method according to claim 5, further comprising transmitting information for causing all nodes to which the second frames are transmitted to confirm the agreement.

* * * * *